(12) United States Patent
Matsumoto et al.

(10) Patent No.: US 6,886,872 B2
(45) Date of Patent: May 3, 2005

(54) AUTOMOBILE BUMPER STRUCTURE

(75) Inventors: Takao Matsumoto, Fuchu-cho (JP); Arihiro Furumoto, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/737,912

(22) Filed: Dec. 18, 2003

(65) Prior Publication Data

US 2004/0124643 A1 Jul. 1, 2004

(30) Foreign Application Priority Data

Dec. 25, 2002 (JP) .......................... 2002-373383
Dec. 25, 2002 (JP) .......................... 2002-373407

(51) Int. Cl.⁷ .............................................. B60R 19/52
(52) U.S. Cl. ........................ 293/115; 293/120; 293/155
(58) Field of Search ................................ 293/115, 120, 293/155, 102, 121, 132, 133, 122, 117, 109; 296/187.09, 203.02, 193.1, 208

(56) References Cited

U.S. PATENT DOCUMENTS

| | | | | |
|---|---|---|---|---|
| 2,578,068 A | * | 12/1951 | Johnson ........................ | 293/115 |
| 4,597,603 A | * | 7/1986 | Trabert ......................... | 293/115 |
| 4,765,665 A | * | 8/1988 | Akahoshi ...................... | 293/155 |
| 5,046,550 A | * | 9/1991 | Boll et al. ..................... | 165/41 |
| 5,409,288 A | * | 4/1995 | Masuda ........................ | 293/155 |
| 6,237,990 B1 | * | 5/2001 | Barbier et al. .......... | 296/187.09 |
| 6,260,609 B1 | * | 7/2001 | Takahashi ..................... | 165/69 |
| 6,540,275 B1 | * | 4/2003 | Iwamoto et al. ............. | 293/120 |
| 6,659,220 B2 | * | 12/2003 | Kobayashi ................... | 293/155 |
| 6,663,151 B2 | * | 12/2003 | Mansoor et al. ............. | 293/120 |
| 6,676,179 B2 | * | 1/2004 | Sato et al. .................... | 293/115 |
| 2004/0144522 A1 | * | 7/2004 | Bauer et al. ................... | 165/67 |

FOREIGN PATENT DOCUMENTS

| | | | |
|---|---|---|---|
| JP | 5830874 | * | 2/1983 |
| JP | 4244448 | * | 9/1992 |
| JP | 200108815 | * | 4/2000 |
| JP | 2002059794 | * | 2/2002 |
| JP | 2002-205613 | | 7/2002 |
| JP | 2002-274298 | | 9/2002 |

* cited by examiner

*Primary Examiner*—Kiran B. Patel
(74) *Attorney, Agent, or Firm*—Donald R. Studebaker; Nixon Peabody, LLP

(57) ABSTRACT

An automobile bumper structure is provided which is capable of keeping down an increase in weight, strongly supporting a reinforcement member with a vehicle structure body behind it, preventing a pedestrian or the like from getting caught under a vehicle when the vehicle has hit the pedestrian or the like. In this automobile bumper structure, a bumper face 2 includes an opening portion 4, and a reinforcement member 20 is disposed behind and inside of a bumper lower face 2b which extends downward from this opening portion 4. Side-plane portions 22, an upper-plane portion 24, a front-plane portion 26 and a lower-plane portion 28 are formed in the reinforcement member 20. A vertical rib 32 is provided across the upper-plane portion 24, the front-plane portion 26 and the lower-plane portion 28. An extended portion 29 is united with the lower-plane portion 2 and extends rearward from it, and this extended portion 29 is connected to a cross member which is disposed behind a bumper structure body 1 and is also connected to an under cover.

9 Claims, 15 Drawing Sheets

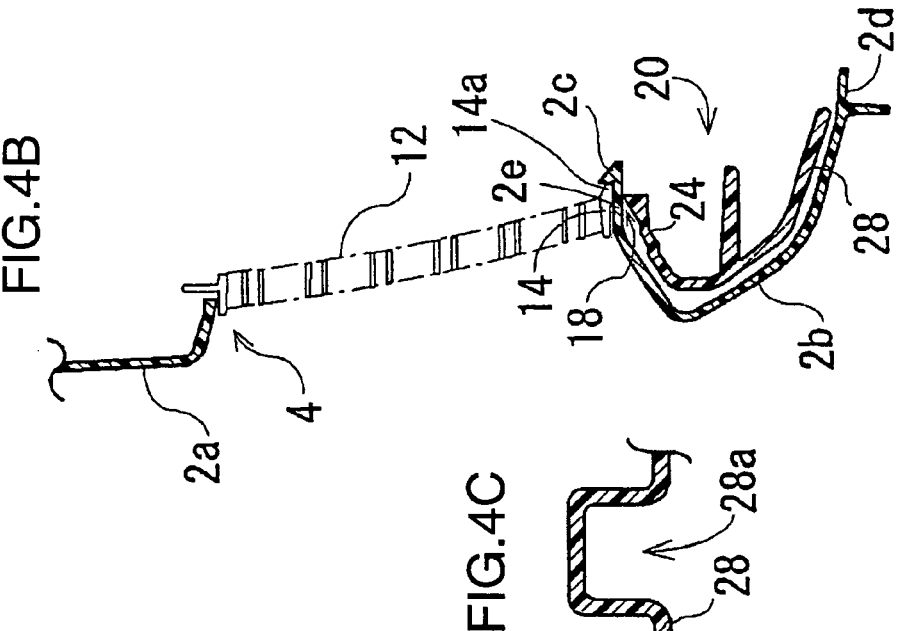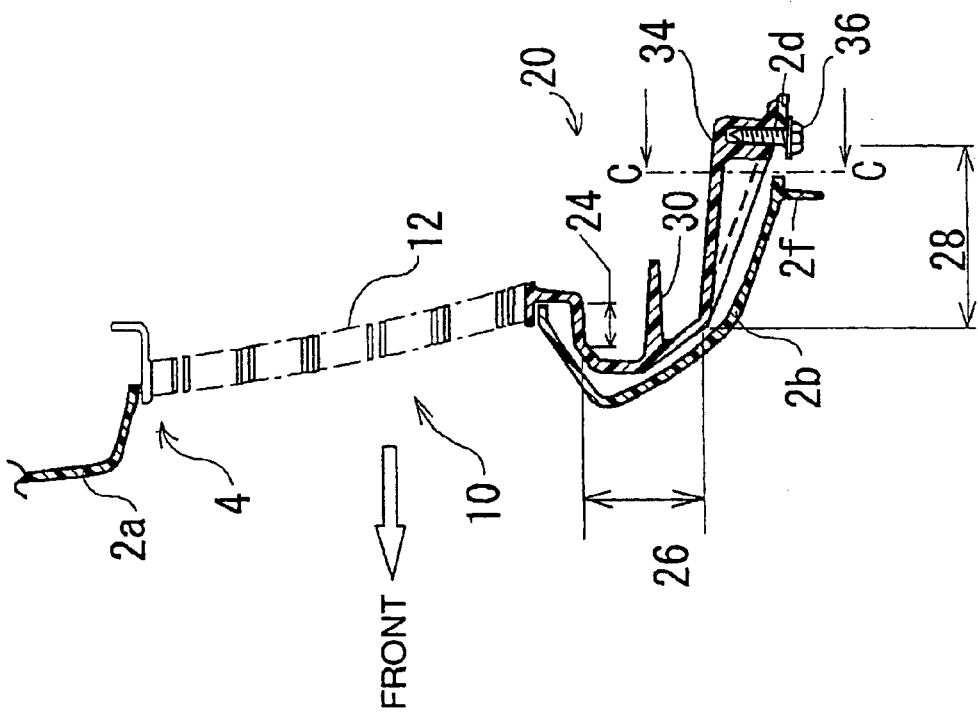

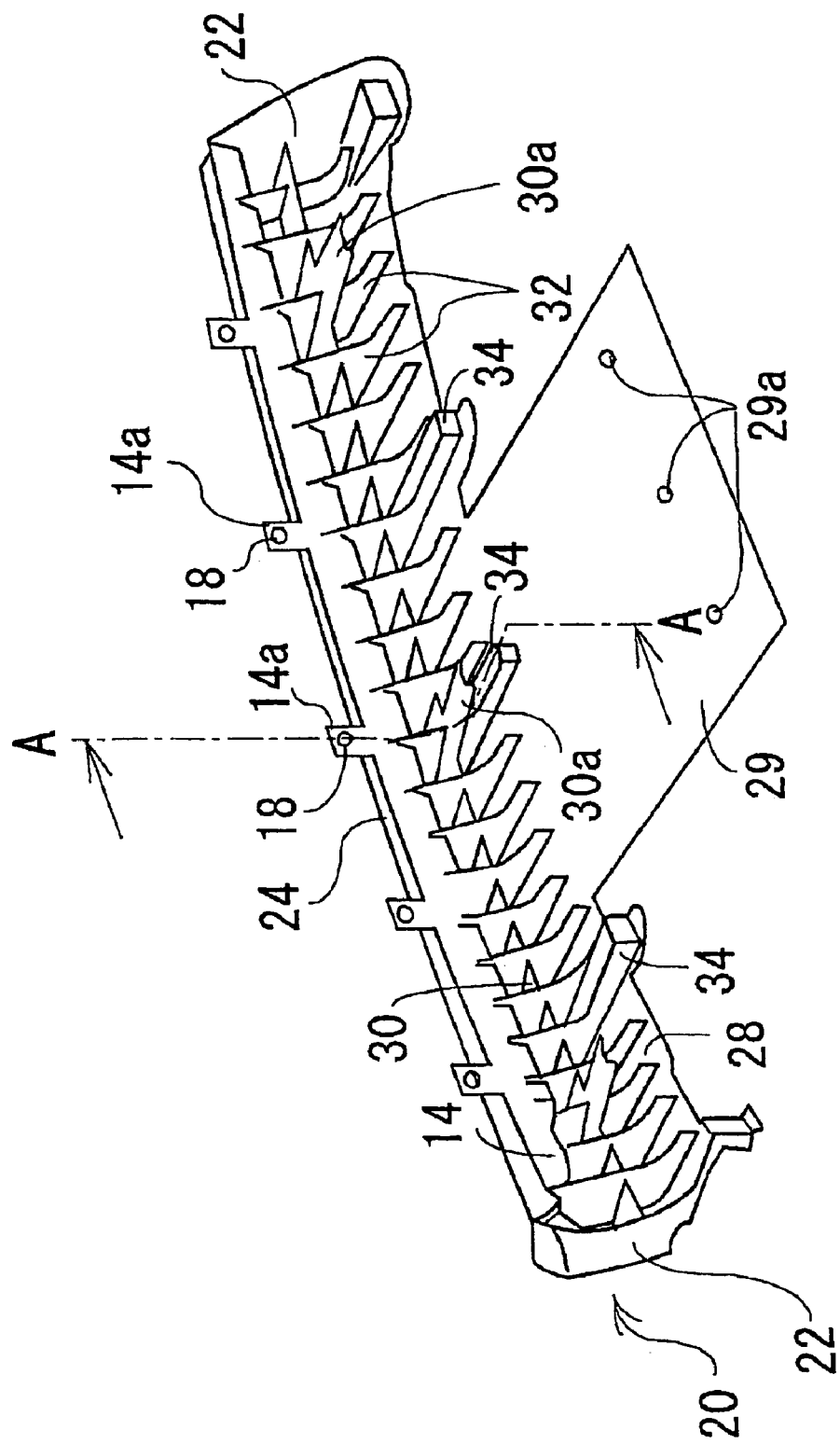

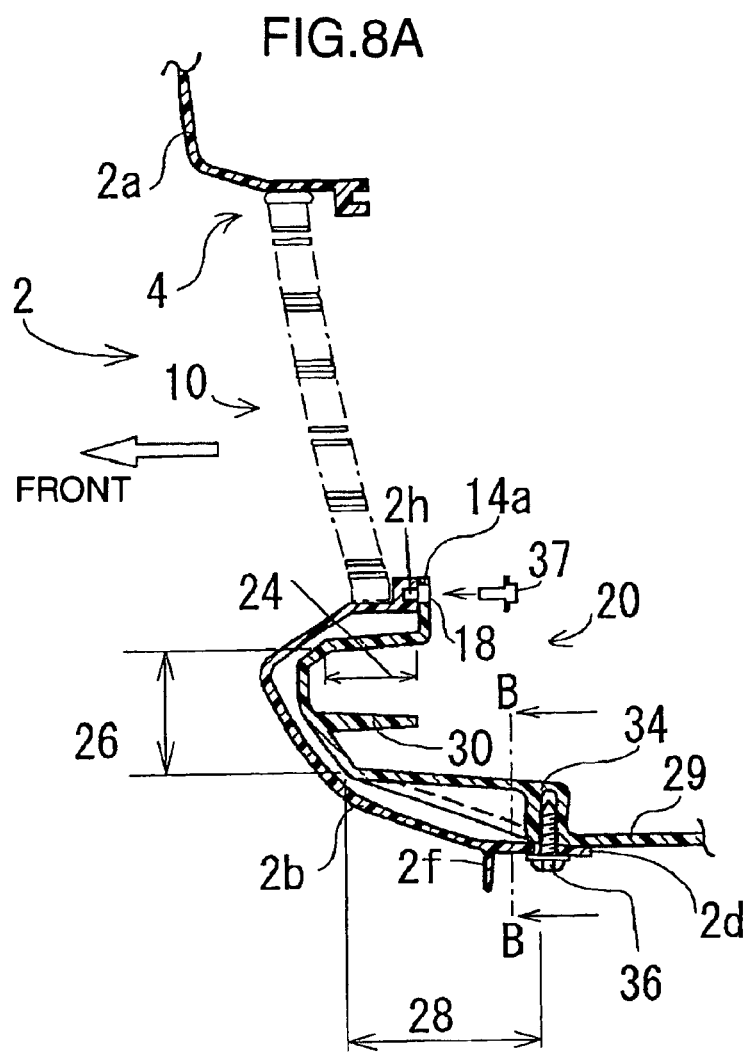
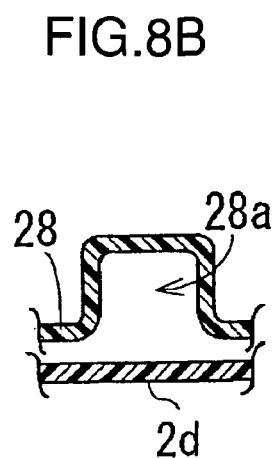
FIG.8A
FIG.8B

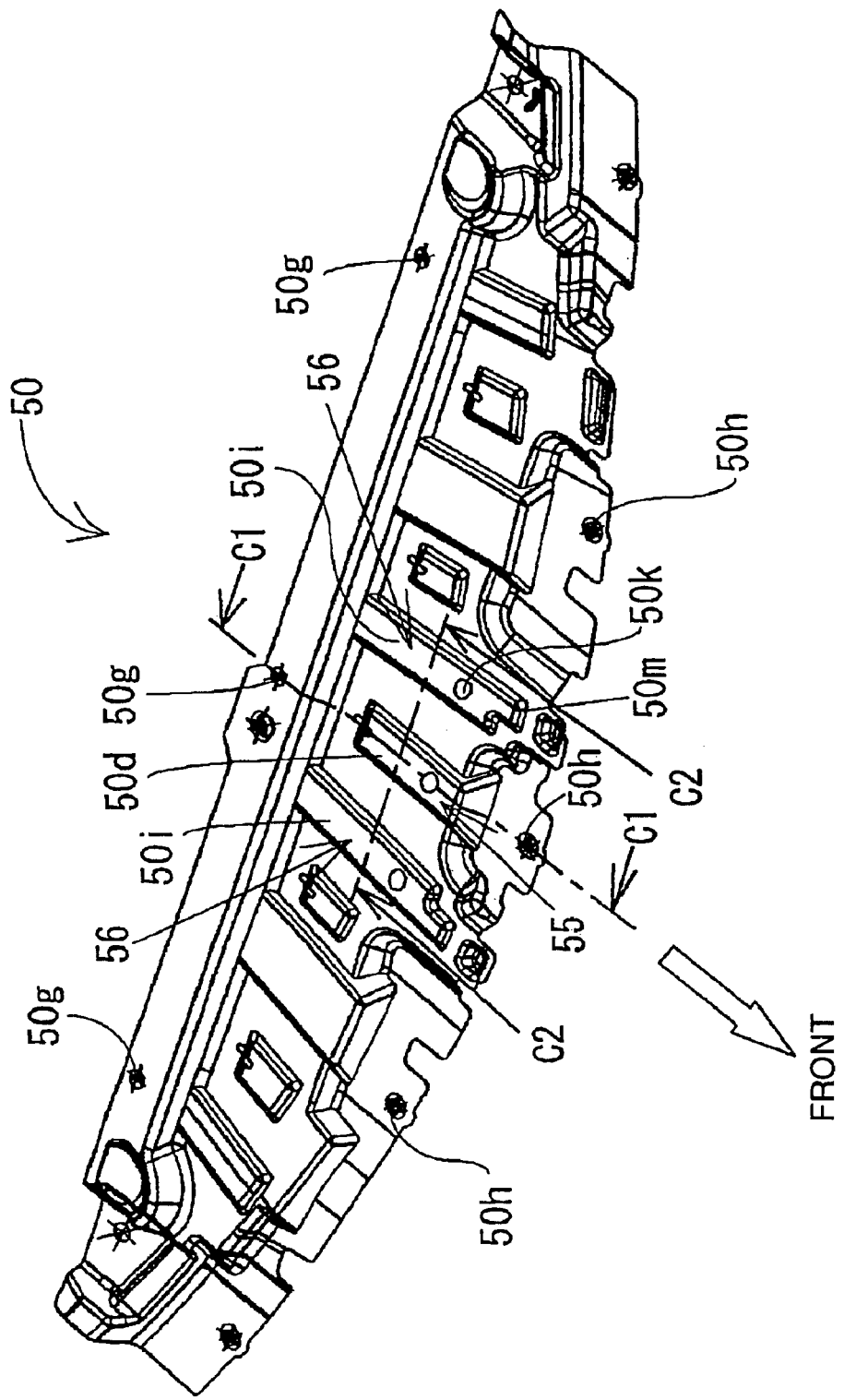

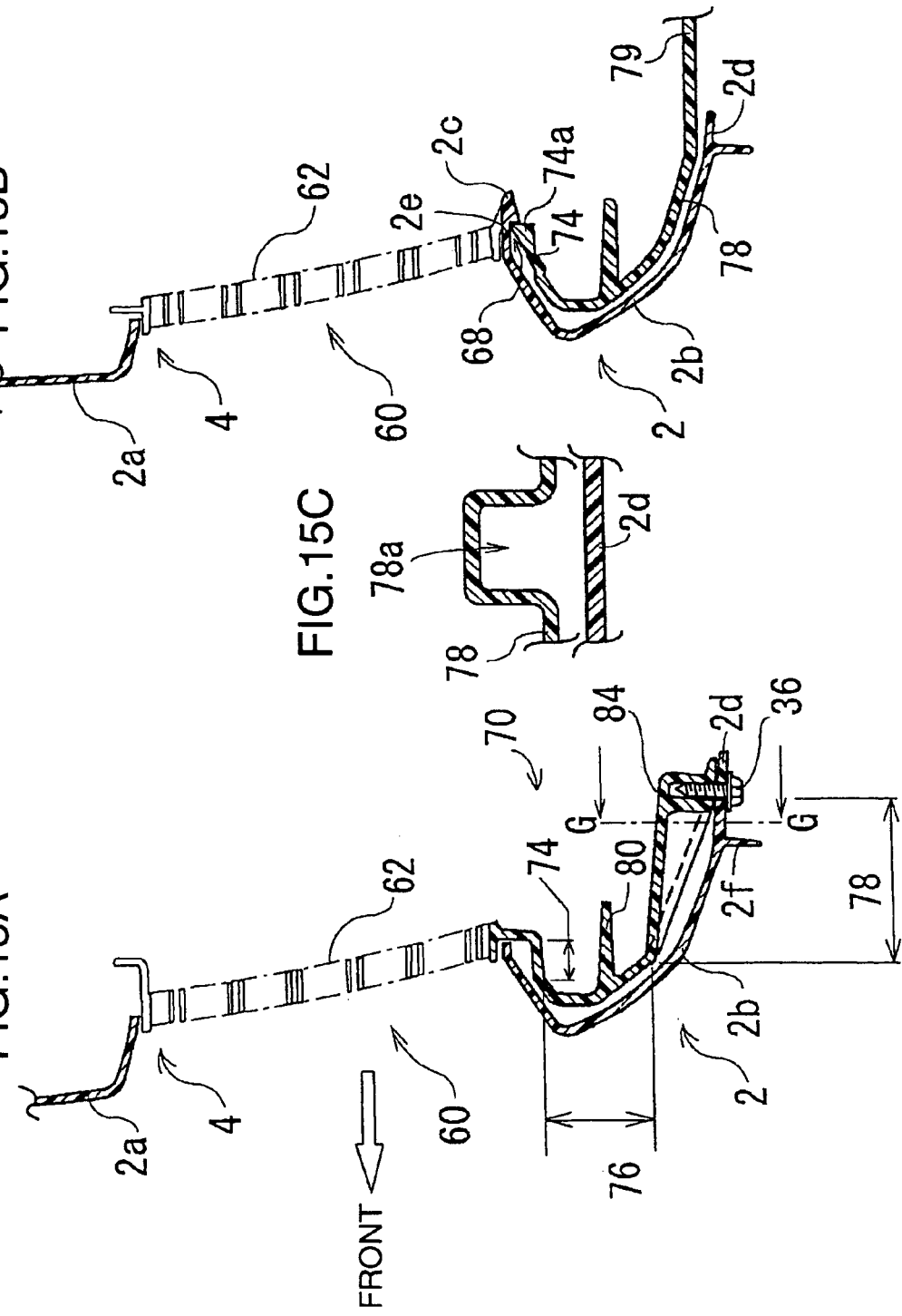

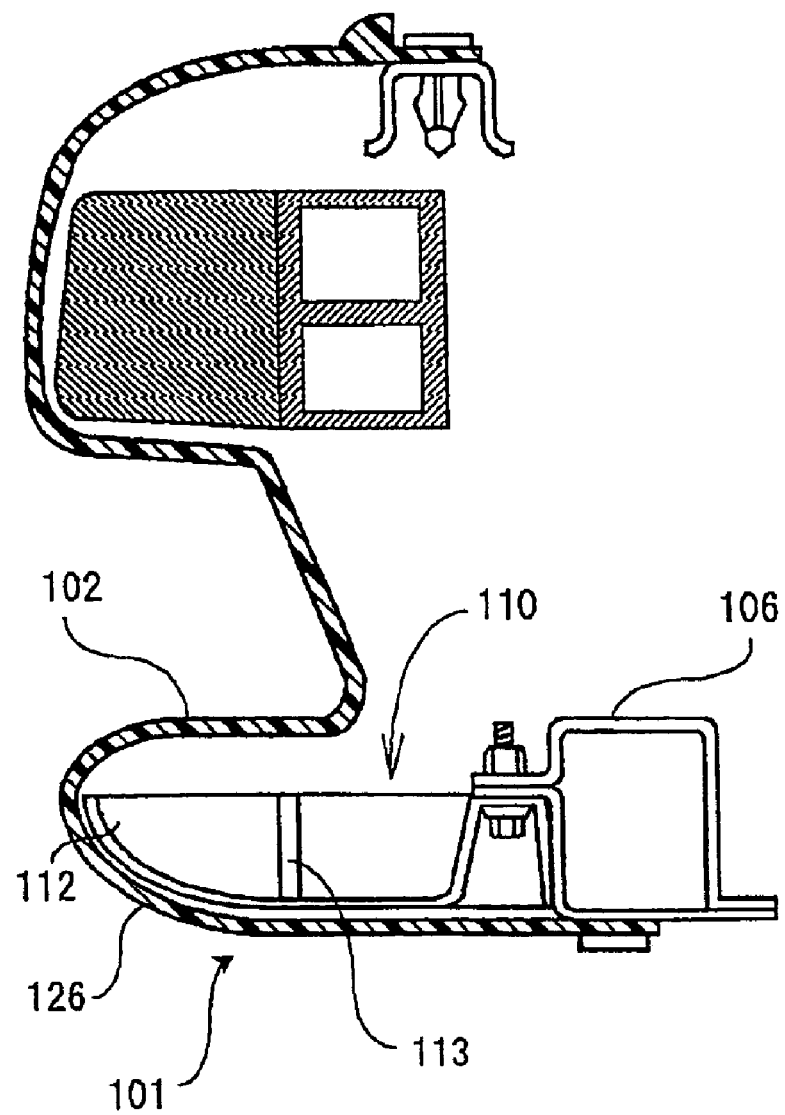

AUTOMOBILE BUMPER STRUCTURE

BACKGROUND OF THE INVENTION

1. Field of the Invention

This invention relates to an automobile bumper structure.

2. Description of the Related Art

With respect to an automobile bumper structure, a structure is known as shown in FIG. 16A and FIG. 16B (refer to Japanese Patent Laid-Open No. 2002-205613 specification). Herein, FIG. 16B is a sectional view of the structure, seen along a Y9—Y9 line in FIG. 16A. This structure is configured by: right and left bracket bodies 135 whose rear-end parts are each supported via an attachment plate 136 and which are curved toward the rear of a bumper face under 126 and each extend to a front side frame (not shown); a hollow body 150 which is connected to these right and left bracket bodies 135 between them via an attachment plate 132; a vertical rib 152 and a lateral rib 151 which are provided on the front surface of the hollow body 150; and others.

However, this structure increases the number of parts, thereby making its assemblage difficult. It also increases the number of fastening positions, requiring many fastening parts. This makes production costs higher.

This structure is supposed to prevent a pedestrian or the like from getting caught under the body of a vehicle when hit by the vehicle. However, the vertical rib 152 and the lateral rib 151 are formed to protrude forward on the reverse side of (or behind) the bumper face under 126, and thus, an impact, which is given by the tips of those ribs, concentrates on a body part which the pedestrian or the like has been hit on, though there is the bumper face under 126 in front of the ribs. This is expected to make injuries sustained to that body part more severe.

As another automobile bumper structure, a structure shown in FIG. 17 is known (refer to Japanese Patent Laid-Open No. 2002-274298 specification). In the bumper structure disclosed by this specification, the lower part (or a bumper face under 126) of a bumper fascia 102 in a front bumper 101 extends to a frame 106 of a vehicle and connected, at its lower-end part, to the frame 106. Behind and inside of this bumper fascia 102, an impact absorbing body 110 is provided which is fastened to the frame 106 and extends forward. In the impact absorbing body 110 are formed a rib 13 which extends in the vehicle-width directions and a plurality of front-and-rear direction ribs 112 which extend in the front-and-rear directions.

This structure is supposed to prevent a pedestrian or the like from getting caught under the body of a vehicle when hit by the vehicle. However, the impact absorbing body 110, which is a reinforcement member that prevents a pedestrian or the like from getting caught under the vehicle body, is made of resin and is supported only on one side with the frame 106, thereby weakening its supporting rigidity. As a result, when a vehicle has hit a pedestrian or the like, the impact absorbing body 110 may be bent upward from the part at which it is fastened to the frame 106, forcing the pedestrian or the like who has been hit to get caught under the vehicle.

The impact absorbing body 110 is provided with a large number of ribs 112, 113. Thus, to make this impact absorbing body 110 more rigid, the ribs 112, 113 need to be increased in number or to be thickened, thereby increasing its weight.

BRIEF SUMMARY OF INVENTION

In view of the above described problems, it is an object of the present invention to provide an automobile bumper structure which is capable of improving its assemblage, keeping the number of parts from increasing, keeping costs from heightening, and in addition, preventing a pedestrian or the like from suffering a more severe blow without getting caught under a vehicle when the pedestrian or the like has been hit by the vehicle.

In the present invention, a pedestrian or the like represents a person who is directly hit by a vehicle, including an ordinary pedestrian as well as a person who is riding a bicycle or a motorcycle.

Specifically, the automobile bumper structure according to a first aspect of the present invention comprises: a bumper face (2) in which an opening portion (4) used for introducing outside air is formed; said bumper face including a bumper lower face (2b) beneath said opening portion, a reinforcement member (20) which is provided behind and inside of said bumper lower face (2b); a grille (10) which is a separate body from the bumper face (2) is attached to the opening portion (4) from behind; and wherein said reinforcement member is connected to at least one part of said grille and is disposed behind and inside of said bumper lower face.

According to this first aspect, there is no need for any attachment member used exclusively as a reinforcement member, such as a bracket shown in the prior arts. This keeps costs from heightening and improves its assemblage. In addition, the reinforcement member can be disposed at a lower part of the bumper, thereby preventing a pedestrian or the like from getting caught behind the reinforcement member, or under a vehicle, when the pedestrian or the like has been hit by the vehicle.

These and other objects, features and advantages of the present invention will become more apparent upon reading of the following detailed description along with the accompanied drawings.

BRIEF DESCRIPTION OF THE DRAWINGS

FIG. 4A is a sectional view of a bumper face which is connected to the grille, seen along an A—A line in FIG. 3.

FIG. 4B is a sectional view of the bumper face which is connected to the grille, seen along a B—B line in FIG. 3.

FIG. 4C is a sectional view of a reinforcement member, seen along a C—C line in FIG. 4A.

FIG. 7 is a perspective view of a reinforcement member, showing its rear part, according to a second embodiment of the present invention.

FIG. 8A is a sectional view of the reinforcement member, seen along an A—A line in FIG. 7.

FIG. 8B is a sectional view of the reinforcement member, seen along a B—B line in FIG. 8A.

FIG. 9 is a perspective view of an under cover, showing its shape.

FIG. 15A is a sectional view of the reinforcement member, seen along an E—E line in FIG. 14.

FIG. 15B is a sectional view of the reinforcement member, seen along an F—F line in FIG. 14.

FIG. 15C is a sectional view of the reinforcement member, seen along a G—G line in FIG. 15A.

FIG. 17 is a sectional view of another conventional bumper structure.

DETAILED DESCRIPTION OF INVENTION

Hereinafter, the automobile bumper structure according to embodiments of the present invention will be described in detail with reference to the accompanied drawings. However, the present invention is not limited to the embodiments described below.

Figure 1:
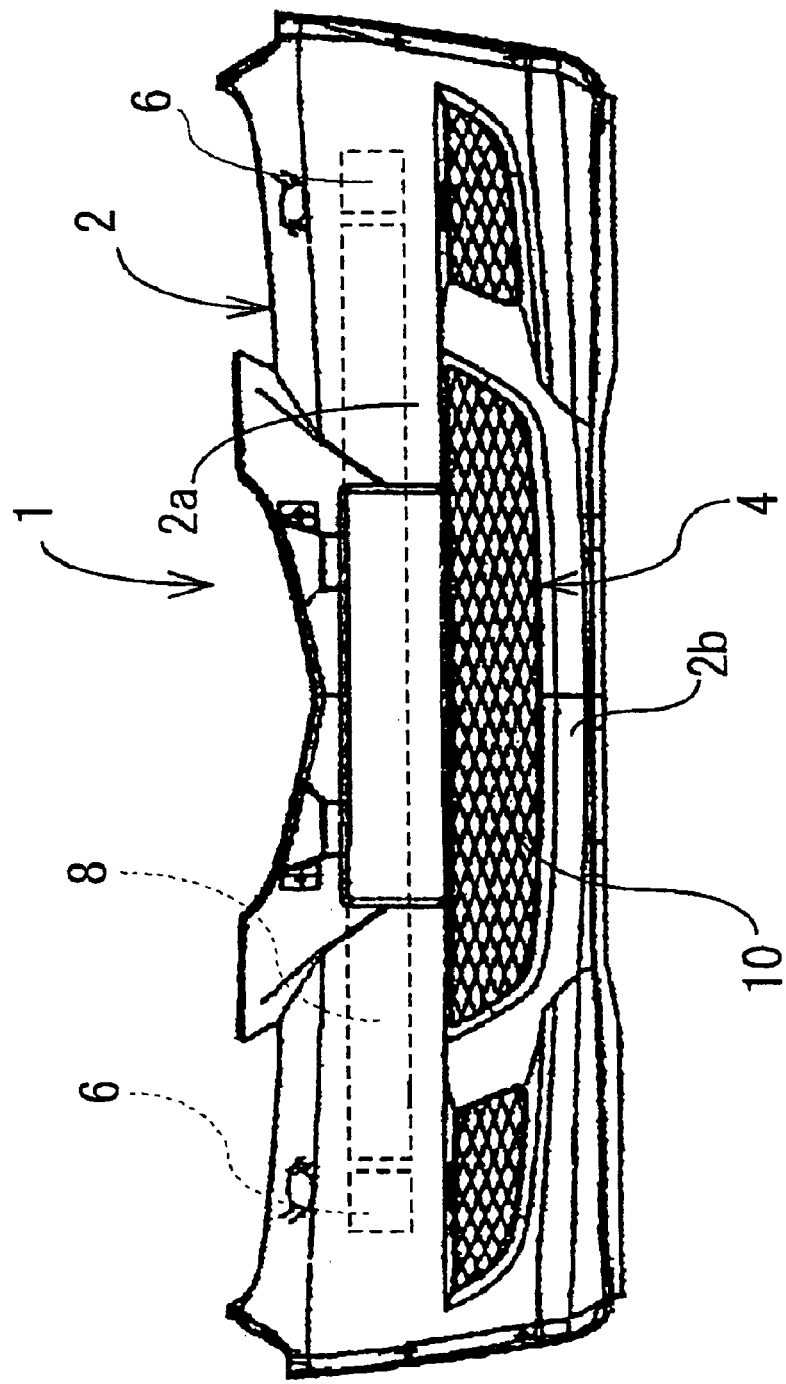
FIG. 1 is a front view of an automobile bumper structure body according to a first embodiment of the present invention.

FIG. 1 is a front view of an automobile bumper structure body 1 according to the present invention. This bumper structure body 1 is configured by: a bumper face 2; a grille 10; a crush cant 6; a bumper reinforcement 8; and others, and is incorporated in the front part of a vehicle body. This crush cant 6 and the bumper reinforcement 8, which are used for absorbing energy at the time of a bump, are placed on the back-surface side of a bumper upper face 2a. The bumper face 2 is made up of the bumper upper face 2a and a bumper lower face 2b, which are united by injection molding. Between the bumper upper face 2a and the bumper lower face 2b, an opening portion 4 is formed which is long in the vehicle-width directions. In the opening portion 4, the latticed grille 10 is inserted and fixed from its back-surface side. Herein, the grille 10 is used for introducing outside air into an engine room.

Figure 2:
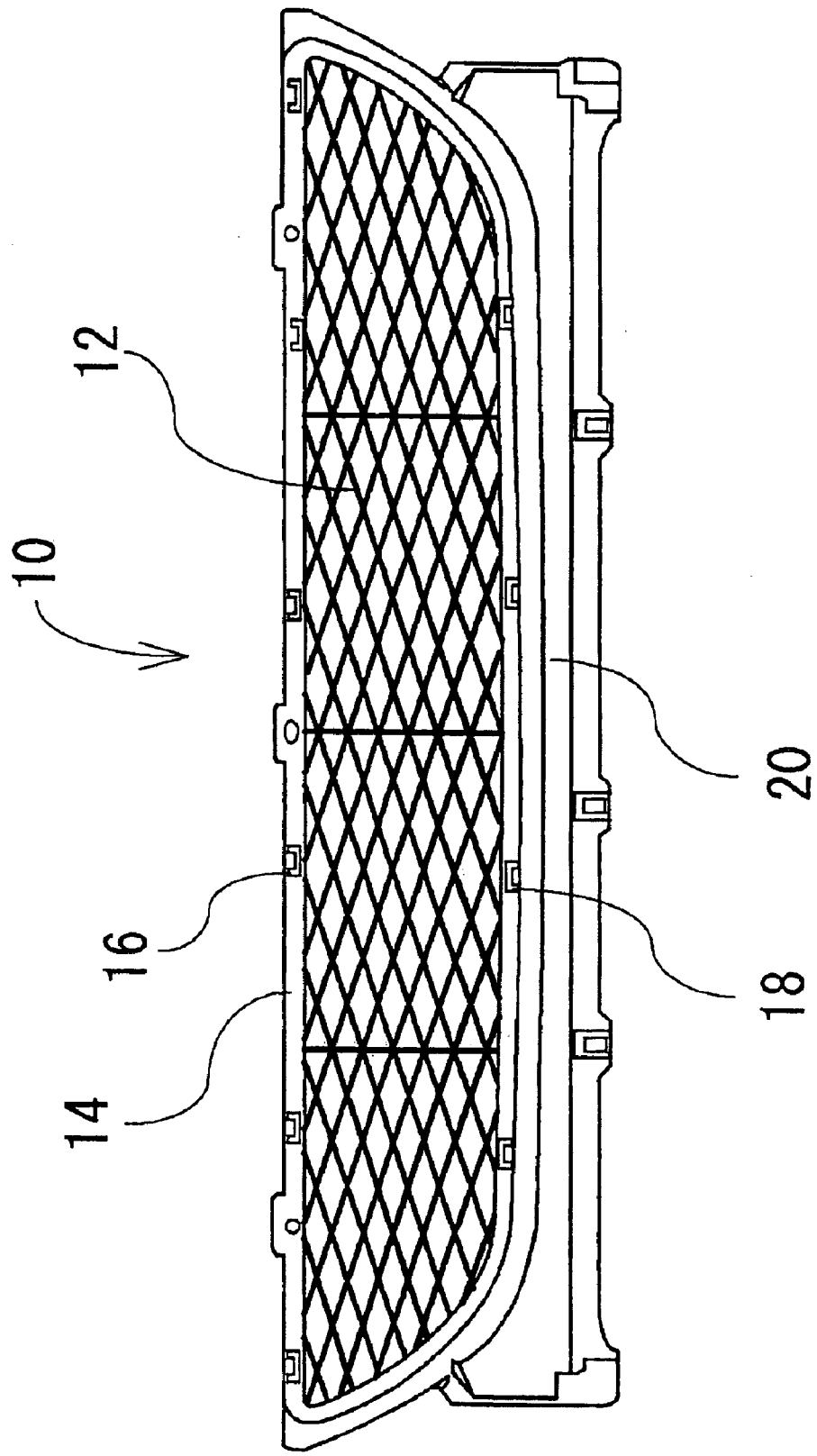
FIG. 2 is a front view of a grille.
Figure 3:
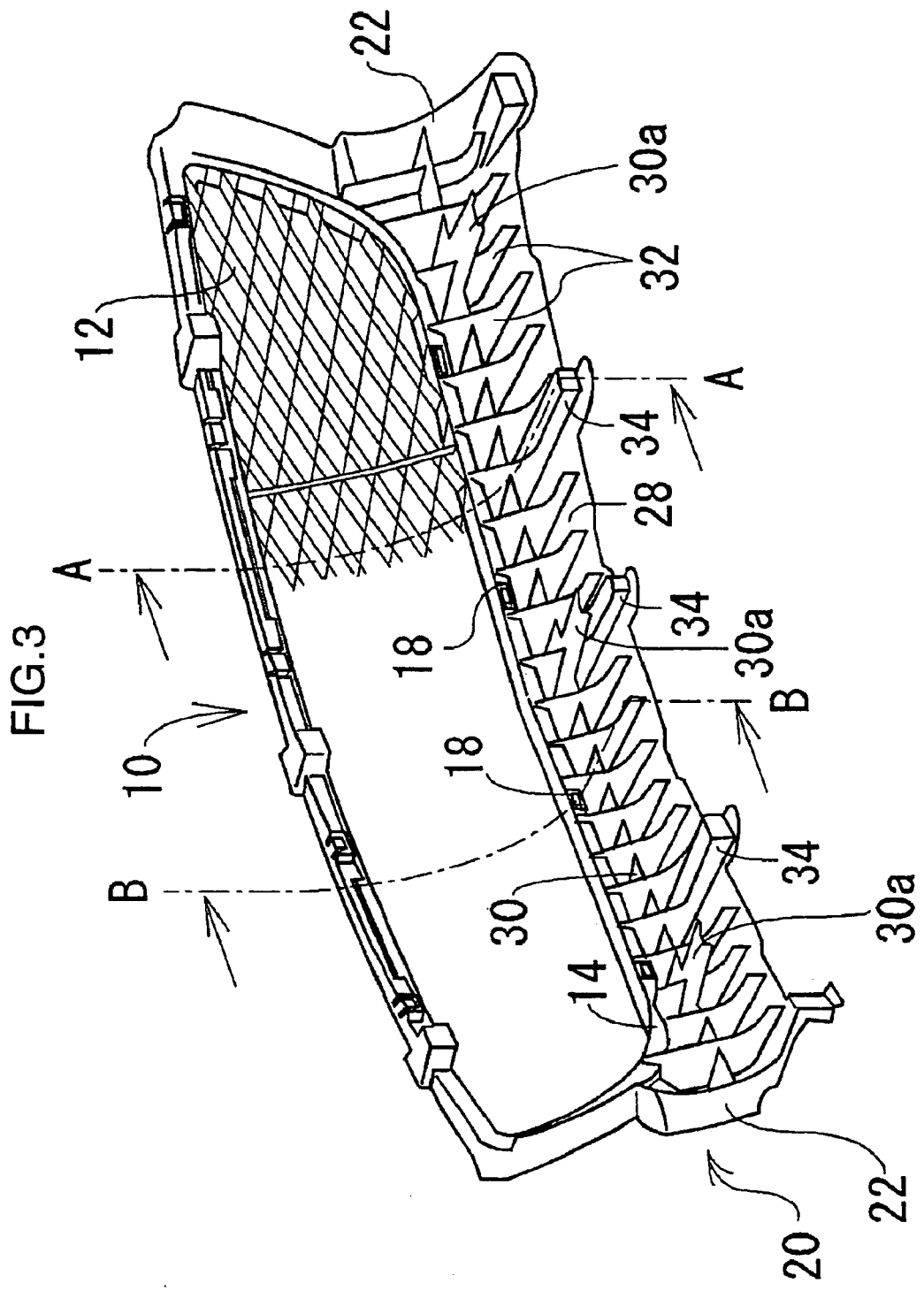
FIG. 3 is a perspective view of the grille, showing its back surface.

Next, the grille 10 will be explained using FIG. 2 and FIG. 3. FIG. 2 is a front view of the grille 10, and FIG. 3 is a perspective view of the grille 10, showing its back surface (herein, a part of its latticework is omitted). As shown in FIG. 2 and FIG. 3, the grille 10 is united to: a latticed portion 12 which has a latticed shape; its peripheral portion 14; and a reinforcement member 20 which hangs down from the peripheral portion 14 under the latticed portion 12 and extends in the vehicle-width directions. The reinforcement member 20 has a substantially arc shape in plan view, and extends in the vehicle-width directions. In the peripheral portion 14, a plurality of hooking holes 16, 18 are formed above and below the latticed portion 12, respectively. These hooking holes 16, 18 are used for hooking the grille 10 inserted into the opening portion 4 of the bumper face 2 (later, explained in detail).

As shown in FIG. 3, in the reinforcement member 20, a plurality of ribs or the like are provided on its back surface, which makes it stronger and more rigid. This prevents a pedestrian or the like from getting caught under the vehicle.

As shown in FIG. 4, the reinforcement member 20 protrudes ahead of the opening portion 4 in the vehicle front direction and has a receding shape from its front-end down below. In other words, the reinforcement member 20 is placed so as to go substantially along the shape of the bumper lower face 2b behind and inside of the bumper lower face 2b. This reinforcement member 20 includes: side-plane portions 22 which each extend rearward from both end parts thereof in the vehicle-width directions; an upper-plane portion 24 (see FIG. 4A) which extends from slightly below the latticed portion 12 toward the vehicle front; a front-plane portion 26 (see FIG. 4A) which extends downward from the front end of the upper-plane portion 24; and a lower-plane portion 28 which extends rearward from the lower end of the front-plane portion 26. An outside frame is formed by these side-plane portions 22, the upper-plane portion 24, the front-plane portion 26 and the lower-plane portion 28. A lateral rib 30 which links the side-plane portions 22 extends rearward from the front-plane portion 26. In addition, a plurality of vertical ribs 32 are formed which link the upper-plane portion 24 and the lower-plane portion 28 along the front-plane portion 26 and cross substantially perpendicularly to the lateral rib 30. In FIG. 3 and FIG. 4, the single lateral rib 30 is used, but a plurality of lateral ribs 30 may be provided up and down.

The reinforcement member 20 has a strong and rigid structure, and thereby, it will not be easily bent or destroyed even if the vehicle has hit a pedestrian or the like. This prevents the pedestrian or the like from getting caught under the vehicle.

Furthermore, the front-plane portion 26 is united to the front parts of the lateral rib 30 and the vertical ribs 32 in the vehicle-width directions. This prevents an impact, which is given by the tips of those ribs, from concentrating, as is often the case with the prior arts, on a body part which a pedestrian or the like has been hit on. As a result, injuries sustained to that body part can be made slighter.

Next, the connecting structure of the grille 10 and the bumper face 2 will be explained, using FIG. 4 which shows its sections. FIG. 4A is a sectional view of the bumper face 2 which is connected to the grille 10, seen along an A—A line in FIG. 3. FIG. 4B is a sectional view of the bumper face 2 which is connected to the grille 10, seen along a B—B line in FIG. 3.

As shown in FIG. 4A, the opening portion 4 is formed between the bumper upper face 2a and the bumper lower face 2b. In the opening portion 4, the latticed portion 12 of the grille 10 is inserted from behind it. The bumper lower face 2b under the opening portion 4 protrudes ahead of the opening portion 4, has a receding shape from its tip down below, and extends a bumper-lower-face lower-plane portion 2d which is placed to extend substantially horizontally.

As described earlier, the grille 10 is united to the latticed portion 12 and the reinforcement member 20, and the reinforcement member 20 is shaped so as to be placed in the rear of the bumper lower face 2b. In the reinforcement member 20 are unitedly linked: the upper-plane portion 24 which protrudes from slightly below the latticed portion 12 toward the vehicle front; the front-plane portion 26 which extends downward from the front end of the upper-plane portion 24; the lower-plane portion 28 which extends rearward from there down below; and the side-plane portions 22.

In the lower-plane portion 28 of the reinforcement member 20, a plurality of thick portions 34 are formed in its rear (see FIG. 3). This thick portion 34 is fastened to the bumper-lower-face lower-plane portion 2d by means of a connection member 36. In the bumper-lower-face lower-plane portion 2d, a hanging portion 2f is formed which extends downward. It improves the vehicle's aerodynamics and front appearance., and also helps prevent the connection member 36 or its vicinity from being damaged when it has been hit with an object such as a stone flicked up by the vehicle itself while it is running.

As can be seen from FIG. 4C which shows the section seen along a C—C line in FIG. 4A, the lower-plane portion 28 of the reinforcement member 20 in front of the thick portions 34 includes a reinforcement concave portion 28a which is dented upward. In other words, the thick portions 34 is the part at which the lower-plane portion 28 is fastened to the bumper-lower-face lower-plane portion 2d, and in front of the thick portions 34, the lower-plane portion 28 has a three-dimensional structure with walls in three directions. This presents a very strong structure in which that fastening part and its vicinity are not easily destroyed at the time of a bump.

Hereinbefore, there has been explained the connecting structure of the bumper-lower-face lower-plane portion 2d and the reinforcement member 20. Next, the connecting structure of the upper-end part of the bumper lower face 2b and the reinforcement member 20 will be explained, based on FIG. 4B which is a sectional view of the bumper face 2 which is connected to the grille 10, seen along a B—B line including a through hole 18 in FIG. 3.

In the section B—B, different from the section A—A, the thick portions 34 is not formed at the rear part of the lower-plane portion 28 in the reinforcement member 20. Thus, the reinforcement member 20 is not fastened to the bumper-lower-face lower-plane portion 2d. On the other hand, the hooking holes 18 are formed in the peripheral portion 14 formed at the upper end of the reinforcement member 20. A claw portion 2c, which extends rearward from an upper-plane portion 2e of the bumper lower face 2b, passes through the hooking hole 18. Then, the claw portion 2c is hooked on a claw hooking portion 14a at the rear end of the peripheral portion 14.

As can be seen from the above explanation, the grille 10 positions the latticed portion 12 to the opening portion 4 of the bumper face 2. It also positions the hooking hole 18 to the claw portion 2c. The grille 10 is fitted from behind the bumper face 2, and the thick portions 34 of the reinforcement member 20 is fastened to the lower-plane portion 2d of the bumper lower face 2b. This can reduce the number of members which are used for the assembly, thereby keeping costs down. In addition, the assembling work becomes easier, and the grille 10 can be better fitted into the opening portion 4 formed in the bumper face 2, thus improving their appearance.

Besides, as is not particularly shown in any figures, as another embodiment, the claw of the claw portion 2c may be turned upside down to be hooked on the lower-surface rear-end part of the hooking hole 18 (or the rear-end part of the upper-plane portion 24 of the reinforcement member 20). Or, the hooking hole 18, the claw portion 2c and the claw hooking portion 14a may be provided at the sectional part shown in FIG. 4A.

Furthermore, the bumper structure body 1 according to the present invention has a structure provided with the following character. As shown in FIG. 3, in the grille 10, a plurality of extending portions 30a are provided which extend from the lateral rib 30 toward the vehicle rear. They are united as a part of the grille 10. These extending portions 30a hold vehicle-loaded parts, for example, ahead-lamp washer hose H, as shown in FIG. 5.

Figure 5A:
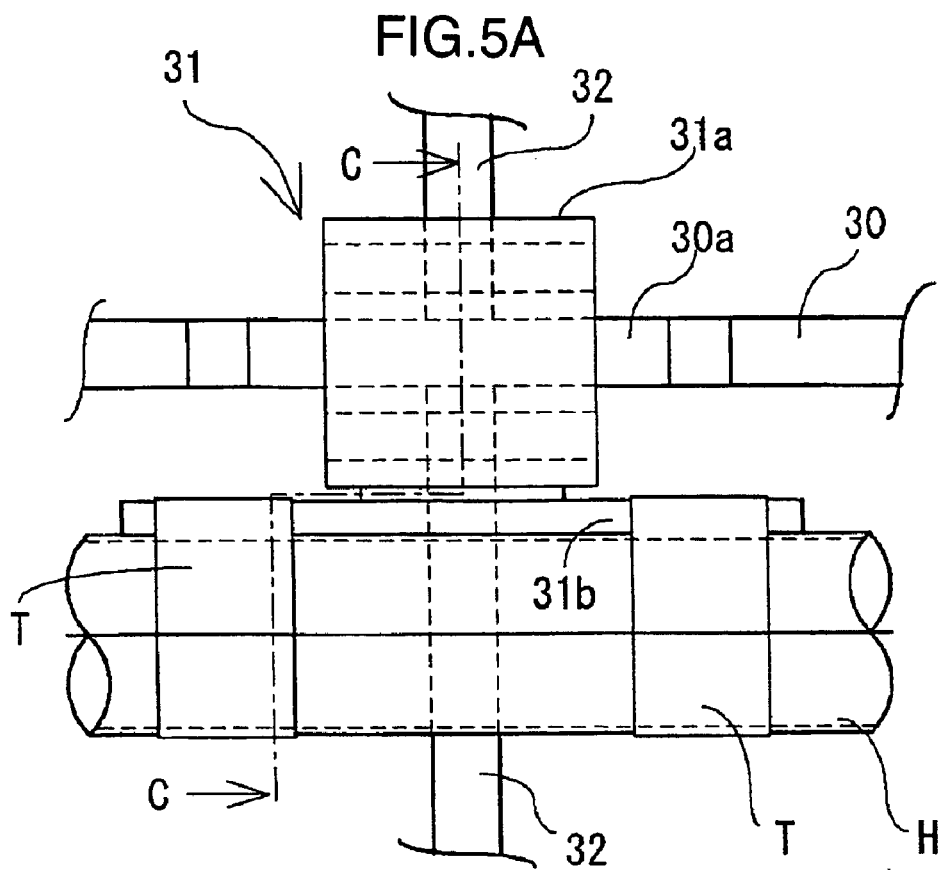
FIG. 5A is a plan view of extending portions which hold vehicle-loaded parts, seen from behind the reinforcement member.
Figure 5B:
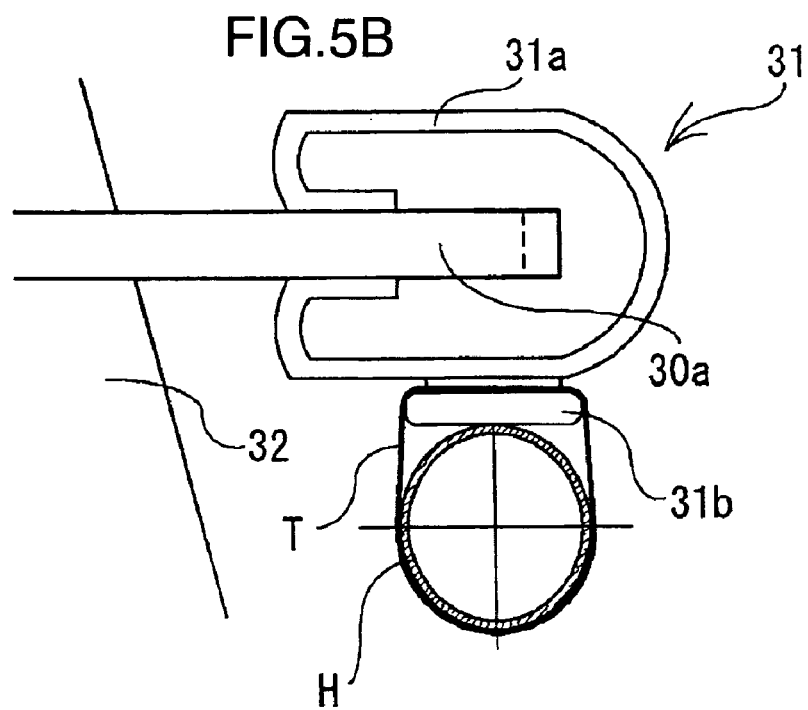
FIG. 5B is a sectional view of the extending portions which hold vehicle-loaded parts, seen along a C—C line in FIG. 5A.

As is not particularly shown in any figures, the head-lamp washer hose H is placed, toward the grille 10, from a windshield washer-fluid tank which is loaded at the vehicle front part behind the grille 10. FIG. 5A is a plan view of the extending portion 30a which holds the head-lamp washer hose H, seen from behind the reinforcement member 20. FIG. 5B is a sectional view, seen along a C—C line in FIG. 5A. A holding member 31 is made up of a holding portion 31a which nips the extending portion 30a strongly up and down, and a flat plate portion 31b which extends in the vehicle-width directions. The head-lamp washer hose H is placed under the flat plate portion 31b and is fixed to the flat plate portion 31b by means of a holding-tape member T. Herein, as another embodiment, the extending portion 30a may hold vehicle parts other than a head-lamp washer hose.

Figure 6:
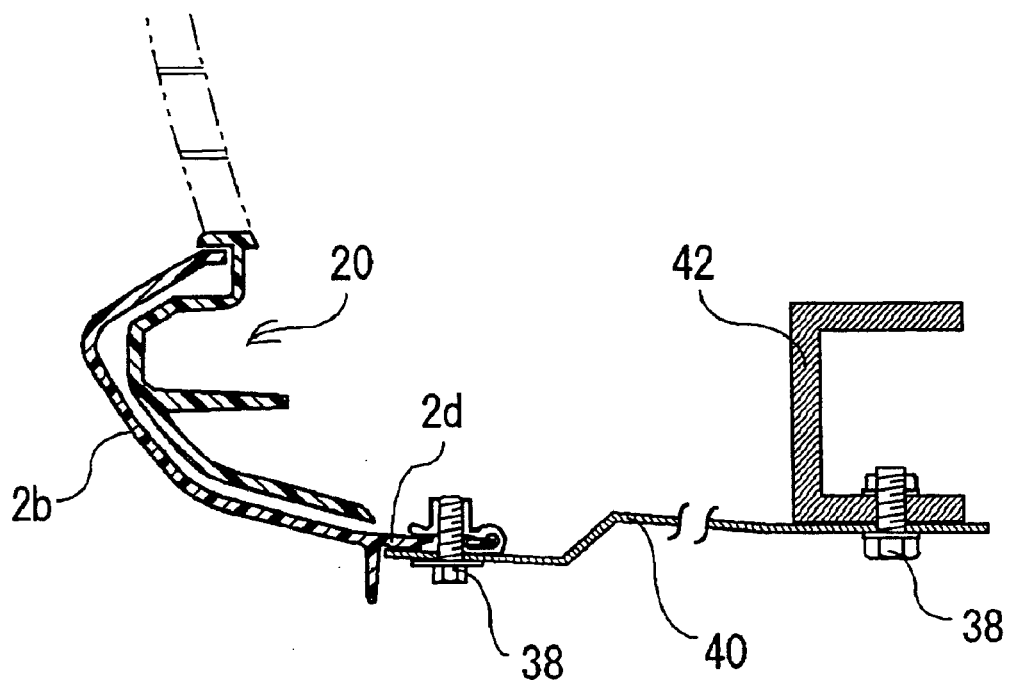
FIG. 6 is a sectional view of an under cover which is kept fastened.

Furthermore, the present invention includes another structure, as an embodiment different from FIG. 4B which is the sectional view, seen along a B—B line in FIG. 3. In that structure, an under cover and the bumper lower face 2b are connected so that the supporting rigidity of the bumper lower face 2b or the like becomes greater. FIG. 6 is a sectional view of a structure in which such an under cover 40 and the bumper lower face 2b are connected. As shown in FIG. 6, the bumper lower face 2b, which includes the reinforcement member 20 on its inside, covers the front-lower part of the vehicle. The lower-plane portion 2d of this bumper lower face 2b is connected, by means of a fastening member 38, to the front part of the under cover 40 which extends in the vehicle-width directions. On the other hand, the rear part of the under cover 40 is connected, by means of another fastening member 38, to the lower part of a cross member 42 which is used as a vehicle structure body.

The structure like this makes greater the supporting rigidity of the bumper lower face 2b, thereby lessening the possibility that the bumper lower face 2b may be bent or broken when the vehicle has hit a pedestrian or the like. As a result, the pedestrian or the like can be prevented from getting caught under the vehicle. As shown in FIG. 4B, the bumper lower face 2b is connected to the reinforcement member 20, thereby making greater the supporting rigidity of the reinforcement member 20 as well as the supporting rigidity of the bumper structure body 1 itself. At the same time, the under cover 40 helps improve the vehicle's aerodynamics when it is running. Herein, as another embodiment, the under cover 40 may also be connected to vehicle structure bodies other than the cross member 42.

In addition to the above described structures, the under cover 40 may also be connected to the lower-plane portion 2d of the bumper lower face 2b at the sectional part, seen along an A—A line in FIG. 3. According to this configuration, it is connected to the thick portions 34 provided at the rear end of the reinforcement member 20, together with the lower-plane portion 2d.

The above description has shown the structure in which the grille 10 and the reinforcement member 20 are united. However, the present invention is not limited to this. For example, the grille 10 may be formed separately from the reinforcement member 20. In that case, the lower part of the grille 10 is mechanically connected beforehand, by means of fastening members, at several parts to the upper part of the reinforcement member 20. Then, this connected body is incorporated into the bumper face 2 from behind it to complete a bumper structure body. In this case, other parts than the connecting structure of the grille 10 and the reinforcement member 20 are the same as described with reference to FIG. 2 to FIG. 6 or as other embodiments. Herein, those other parts includes: the structure of the ribs 30, 32; the shapes of the extending portions 30a which hold vehicle parts loaded behind the grille 10, and the upper-plane portion 24, the front-plane portion 26, the lower-plane portion 28 and the thick portions 34 of the reinforcement member 20; the structure in which the reinforcement member 20 is fastened to the bumper lower face 2b; the structure in which it is fastened to the under cover 40; and others.

FIG. 7 is a perspective view of the reinforcement member 20 of the bumper structure body 1 according to a second embodiment of the present invention. In the lower-plane portion 28 of the reinforcement member 20, an extended portion 29 is provided which extends rearward with a predetermined width at its substantially middle part in the vehicle-width directions. This extended portion 29 is provided with a plurality of attachment holes 29a which are formed in its plane. Using these attachment holes 29a, it is connected to a connection plate which extends forward from a vehicle structure body (mentioned later). This makes the bumper structure body 1 stronger and more rigid.

Except for the extended portion 29, the reinforcement member 20 is compact so that it can be placed into the bumper lower face 2b, thus keeping down an increase in weight.

Figure 16A:
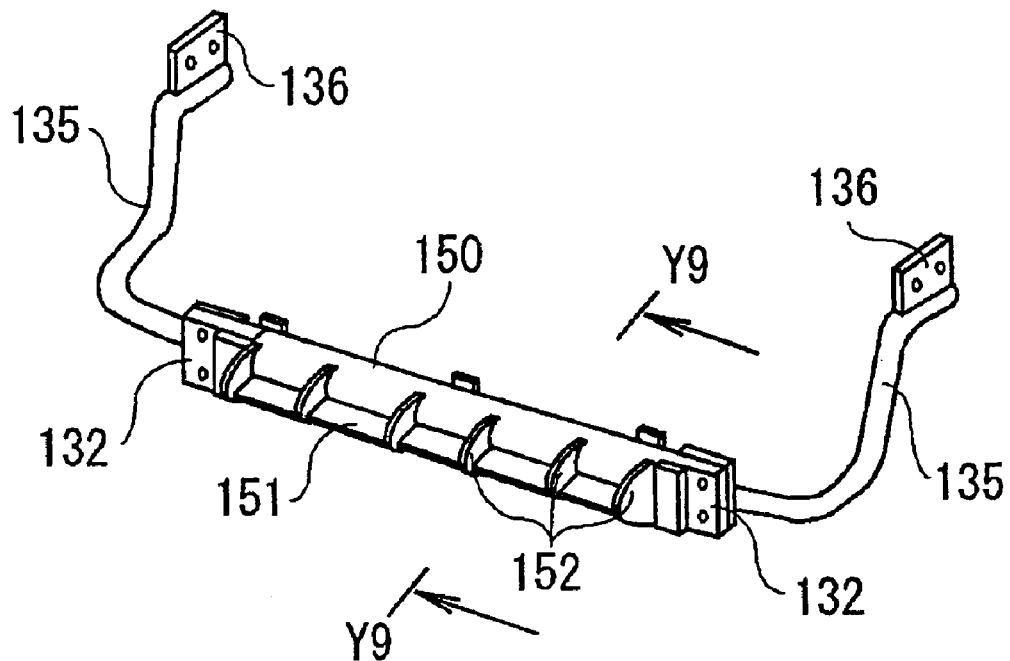
FIG. 16A is a perspective view of a conventional bumper structure.
Figure 16B:
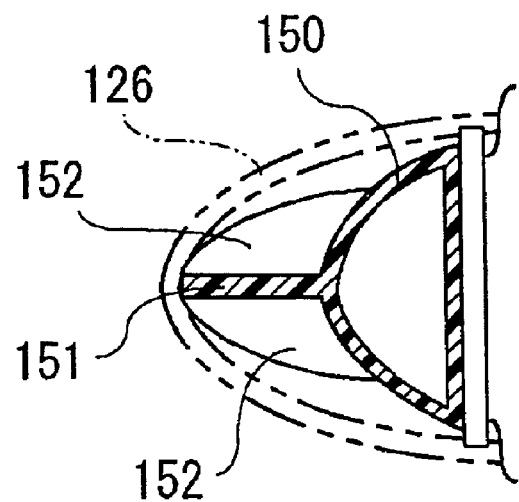
FIG. 16B is a sectional view of the bumper structure, seen along a Y9—Y9 line in FIG. 16A.

Furthermore, the lateral rib 30 and the vertical ribs 32 are united at their front parts to the front-plane portion 26 of the reinforcement member 20. In other words, those are not shaped like protruding forward, as has been shown in the prior art (see FIG. 16). This prevents an impact, which is given by the tip part of an impact absorbing body, from concentrating on a body part which a pedestrian or the like has been hit on. As a result, injuries sustained to that body part can be made slighter.

The connecting structure of the reinforcement member 20 and the bumper face 2 will be explained, using FIG. 8 which shows its section. FIG. 8A is a sectional view of the reinforcement member 20 and the bumper face 2 which is connect to it, seen along an A—A line in FIG. 7. FIG. 8B is a sectional view, seen along a B—B line in FIG. 8A.

As shown in FIG. 8A, the opening portion 4 is formed between the bumper upper face 2a and the bumper lower face 2b. In the opening portion 4, the grille 10 is inserted from its front and is attached. The bumper lower face 2b under the opening portion 4 protrudes ahead of the opening portion 4, has a receding shape from its tip down below and extends up to a bumper-lower-face rear-end portion 2d which is substantially horizontal.

In the upper-plane portion 24 of the reinforcement member 20, the peripheral portion 14 (see FIG. 7) is provided which extends upward from its rear part. In the peripheral portion 14, a plurality of extending portions 14a which extend upward are provided in the vehicle-width directions. In each extending portion 14a, a through hole 18 is formed. In the upper-end part of the bumper lower face 2b, fastening holes 2h are formed. This fastening hole 2h is positioned to the through hole 18 of the reinforcement member 20, and then, the reinforcement member 20 is fastened, by means of a fastening member 37, to the bumper lower face 2b.

Next, there will be explained, based on FIG. 9 to FIG. 12, the connection of the extended portion 29 which is formed in the lower-plane portion 28 of the reinforcement member 20 and a connection plate which extends forward from a vehicle structure body. FIG. 9 is a perspective view of the connection plate, showing its structure. FIG. 10 are sectional views of the connection plate. FIG. 11 is a plan view of the under cover and the reinforcement member 20 and the connection plate, showing their connecting structure.

Figure 11:
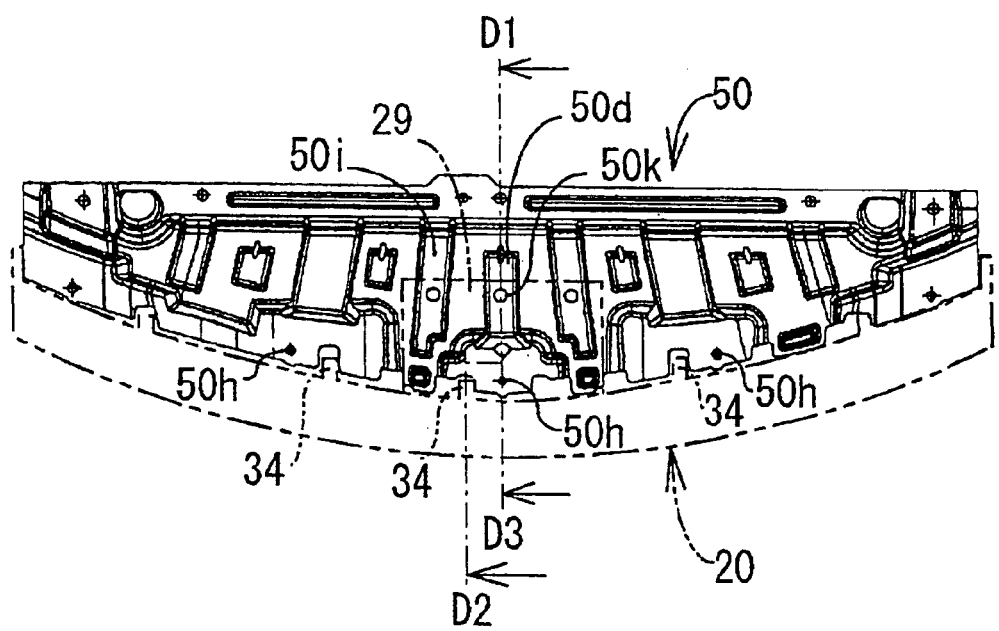
FIG. 11 is a plan view of the under cover and the reinforcement member, showing their connecting structure.
Figure 12:
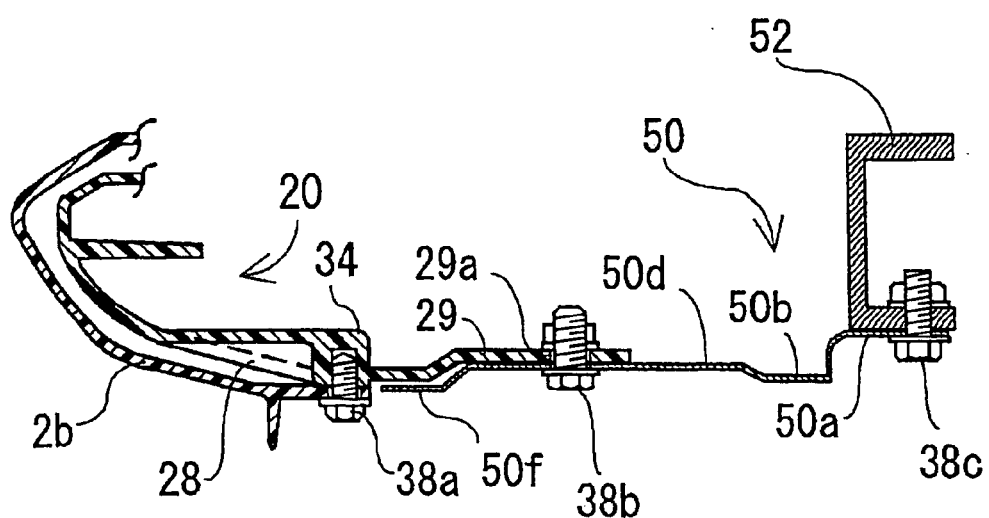
FIG. 12 is a sectional view of the under cover and the reinforcement member, seen along a D1-D2 line in FIG. 11.

FIG. 12 is a sectional view, seen along a D1-D2 line in FIG. 11, which shows the connecting structure of the extended portion 29, the connection plate and a vehicle structure body.

First, the structure of the connection plate will be explained with reference to FIG. 9. The connection plate according to this embodiment is configured by an under cover 50 which covers a lower part of the vehicle body. The under cover 50 is one of the vehicle parts that are commonly used for lowering the running resistance of a vehicle when it is running. The front part of the under cover 50 according to the embodiment of the present invention has an arc shape so that it goes along the shape of the rear-end part of the lower-plane portion 28 in the reinforcement member 20. On the other hand, its rear part is shaped like extending in a straight line in the vehicle-width directions (see FIG. 11).

Figure 10A:
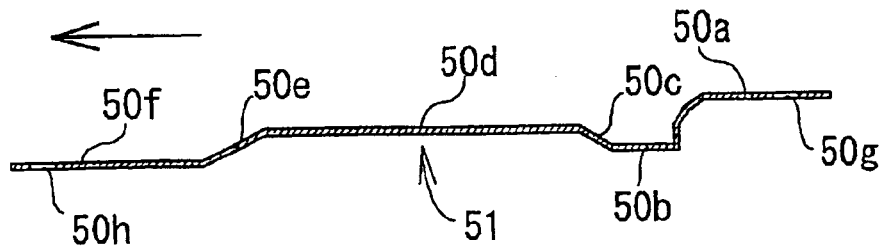
FIG. 10A is a sectional view of the under cover, seen along a C1—C1 line in FIG. 9.

As can be seen from the sectional view of FIG. 10A, the under cover 50 includes: a rear connection-plane portion 50a; a flat-plane portion 50b; an inclined-plane portion 50c; a reinforcement structure-part upper-plane portion 50d; an inclined-plane portion 50e; and a front connection-plane portion 50f. The flat-plane portion 50b goes down forward from the rear connection-plane portion 50a and then extends forward. The inclined-plane portion 50c extends forward and upward from the flat-plane portion 50b. The reinforcement structure-part upper-plane portion 50d extends forward from the inclined-plane portion 50c. The inclined-plane portion 50e extends forward and downward from the reinforcement structure-part upper-plane portion 50d. The front connection-plane portion 50f extends forward from the inclined-plane portion 50e, and is connected to the thick portions 34 of the reinforcement member 20 and the rear-end portion 2d of the bumper lower face 2b. In the rear connection-plane portion 50a, a plurality of round holes 50g are formed, which are used for connecting it, by means of fastening members 38c, to a cross member 52 (see FIG. 12) which is used as a vehicle structure body. In addition, as will be explained later, in the front connection-plane portion 50f, a plurality of round holes 50h are formed, which are used for connecting it, by means of fastening members 38f, to the rear-end portion 2d of the bumper lower face 2b.

Figure 10B:
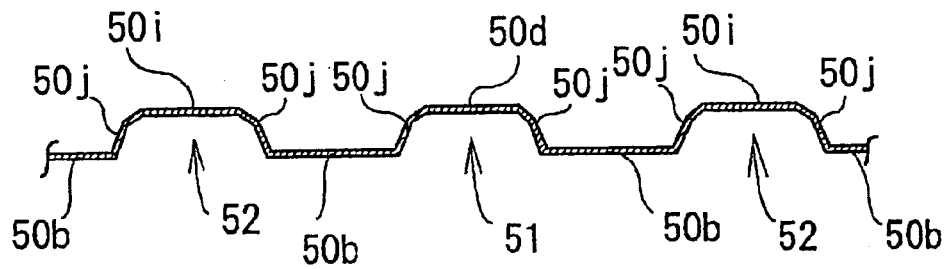
FIG. 10B is a sectional view of the under cover, seen along a C2—C2 line in FIG. 9.

As shown in FIG. 10B which is a sectional view, seen along a C2—C2 line in FIG. 9, the under cover 50 includes a plurality of reinforcement structures which are dented upward from the above described flat-plane portions 50b seen as a reference plane. Specifically, a plurality of reinforcement structure-part upper-plane portions 50d, 50i are placed alongside each other in the vehicle-width directions. Each of them is linked to inclined-plane portions 50j, 50j. These inclined-plane portions 50j, 50j are each formed with an inclination to the flat-plane portion 50b. Thus, under the reinforcement structure-part upper-plane portions 50d, 50I, concave portions 51, 52 are formed respectively, making its structure three dimensional. If the concave portion 51 is explained as an example, the concave portion 51 is formed by the above described flat-plane portion 50b, inclined-plane portion 50c, reinforcement structure-part upper-plane portions 50d, inclined-plane portion 50e and inclined-plane portions 50j, which form a three-dimensional reinforcement structure portion 55. This structure makes it strong and rigid against an impact from the front. Therefore, if the vehicle hits a pedestrian or the like, the reinforcement member 20 will not be bent or forced back, thereby preventing the pedestrian or the like from getting caught under the vehicle body. Herein, in the rear of the reinforcement structure-part upper-plane portion 50*i*, there are no inclined-plane portions which go down to the flat-plane portions 50*b*. However, the concave portion 52 is formed by the right and left inclined-plane portions 50*j* and an inclined-plane portion 50*m* in the front of the reinforcement structure-part upper-plane portion 50*i*. This makes the structure three dimensional to form a reinforcement structure portion 56.

Next, the connecting structure of the extended portion 29 which extends rearward from the lower-plane portion 28 in the reinforcement member 20 and the under cover 50 will be explained with reference to FIG. 11 and FIG. 12 which shows the section seen along a D1-D2 line in FIG. 11. As shown in FIG. 11, the extended portion 29 is provided over the reinforcement structure-part upper-plane portions 50*d*, 50*i* of the under cover 50. Attachment holes 50*k* which are formed in the reinforcement structure-part upper-plane portions 50*d*, 50I are positioned to the attachment holes 29*a* (see FIG. 12) which are formed in the extended portion 29. Then, the extended portion 29 is fastened to the under cover 50 by means of fastening members 38*b*.

Furthermore, as shown in FIG. 12, the upper surface of the rear connection-plane portion 50*a* which is formed at the rear-end part of the under cover 50 is connected, by means of the fastening members 38*c*, to the cross member 52 which extends in the vehicle-width directions.

On the other hand, the thick portions 34 which is provided at the rear end of the lower-plane portion 28 in the reinforcement member 20 is connected, by means of the fastening members 38*a*, to the rear-end portion 2*d* of the bumper lower face 2*b*.

Next, the connection of the bumper lower face 2*b* and the under cover 50 will be explained with reference to FIG. 13 which shows the section seen along a D1-D3 line in FIG. 11. As can be seen from FIG. 11, the section seen along the D1-D3 line is the section at a part to which a slight shift is made, in the vehicle-width directions, from the section seen along the D1-D2 line. At this sectional part, the front connection-plane portion 50*f* of the under cover 50 which extends ahead of the cross member 52 is connected, by means of the fastening members 38*f*, to the rear-end portion 2*d* of the bumper lower face 2*b*. In addition, as also shown in FIG. 11, the plurality of round holes 50*h* which are provided in the under cover 50 are each placed near the plurality of thick portions 34 of the reinforcement member 20. Therefore, the position in which the bumper lower face 2*b* is connected to the under cover 50 is close to the position in which the reinforcement member 20 is connected to the bumper lower face 2*b*.

Accordingly, the connection part of the reinforcement member 20 and the bumper lower face 2*b* is close to the connection part of the bumper lower face 2*b* and the under cover 50, and the reinforcement member 20 and the under cover 50 are united, within the narrow space, via the bumper lower face 2*b*. This produces the synergism of connecting strengths at these connection parts, and thereby, makes the connection parts and their vicinities stronger and more rigid than in the case where the connection parts are farther apart from each other. In short, it presents the vehicle front structure which has a great strength and rigidity near the connection parts. Therefore, if the vehicle hits a pedestrian or the like, the reinforcement member 20 will not be bent or forced back, thereby preventing the pedestrian or the like from getting caught under the vehicle body. In addition, as compared with the case where three members of the reinforcement member 20, the bumper lower face 2*b* and the under cover 50 are connected at a single part, in this structure, two members are connected separately, and thus, these respective connections are made with relatively less fastening force. Besides, those members are more easily positioned, thus improving their assembly.

Figure 14:
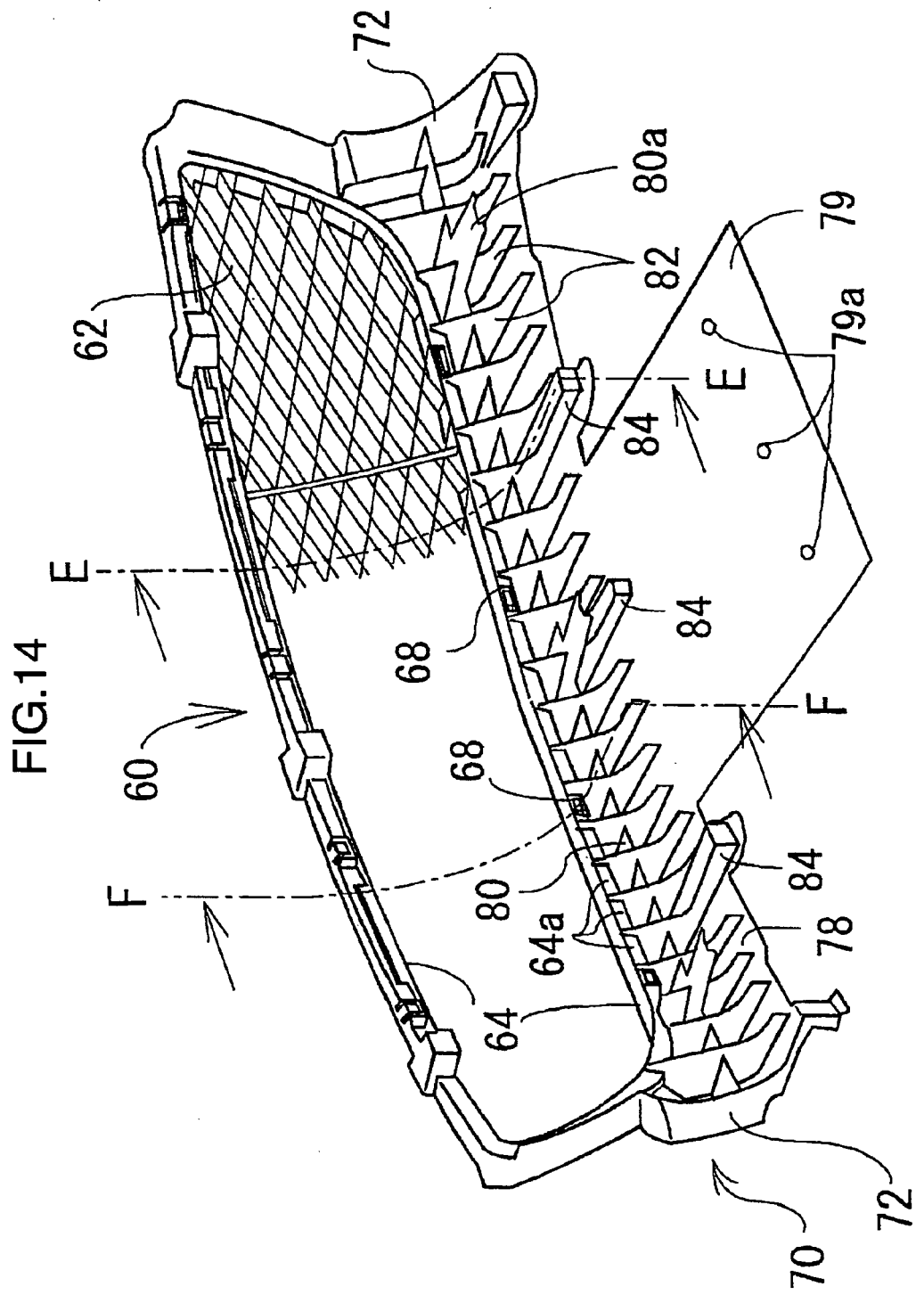
FIG. 14 is a perspective view of a reinforcement member which is united to a grille, showing its rear part, according to a third embodiment of the present invention.

Next, the automobile bumper structure according to a third embodiment of the present invention will be explained. In the structure according to the third embodiment, the reinforcement member 20 is formed unitedly with a grille which is provided in the opening portion 4 (hereinafter, whose structure will be called a grille-united reinforcement member). FIG. 14 is its perspective view, seen from behind it.

In FIG. 14, in a grille-united reinforcement member 60, a latticed portion 62 which has a latticed shape at its upper part is formed unitedly with a peripheral portion 64 which surrounds the latticed portion 62. The peripheral portion 64 under the latticed portion 62 is linked, via a hanging-plane portion 64*a*, unitedly with a reinforcement portion 70 which corresponds to the reinforcement member 20 according to the second embodiment. In the hanging-plane portion 64*a*, a plurality of hooking holes are formed, which is hooked on claw portions (mentioned later) which are formed in the upper-end part of the bumper lower face 2*b*.

The reinforcement portion 70 which is formed as the lower part of the grille-united reinforcement member 60 has almost the same structure as the reinforcement member 20 according to the second embodiment, except for the fact that there are not formed the extending portions 14*a* of the reinforcement member 20 and the through holes 18 of the extending portions 14*a*.

Using FIG. 14 and FIG. 15, the structure of the reinforcement portion 70 will be explained below. FIG. 15A shows the section, seen along an E—E line in FIG. 14, and FIG. 15B shows the section, seen along an F—F line in FIG. 14.

As shown in FIG. 14, the reinforcement portion 70 includes side-plane portions 72 which each extend rearward from both end parts thereof in the vehicle-width directions. Across these side-plane portions 72 and a front-plane portion 76 (see FIG. 15A), a lateral rib 80 is formed, and a vertical rib 82 which crosses substantially perpendicularly to the lateral rib 80 is formed across an upper-plane portion 74 (see FIG. 15A), a front-plane portion 76 and a lower-plane portion 78.

Thus, in the reinforcement portion 70, an outside frame is formed by the side-plane portions 72, the upper-plane portion 74, the front-plane portion 76 and the lower-plane portion 78. The lateral rib 80 and the vertical rib 82 which link those plane portions 72, 74, 76 and 78 are united, thereby making that structure strong and rigid. Therefore, if the vehicle hits a pedestrian or the like, the reinforcement portion 70 will not be bent, thereby preventing the pedestrian or the like from getting caught under the vehicle body.

Next, using FIG. 14 and FIG. 15, the connecting structure of the reinforcement portion 70 and the bumper face will be explained. In FIG. 15, the same reference numerals and characters are used as the bumper face according to the second embodiment. As shown in FIG. 15A, in the lower-plane portion 78 of the reinforcement portion 70, a plurality of thick portions 84 are formed at its rear part (see FIG. 14). This thick portion 84 is fastened to the bumper-lower-face rear-end portion 2*d* by means of the connection member 36. In the lower-plane portion 78 of the reinforcement portion 70, an extended portion 79 is provided which is united with it and extends rearward with a predetermined width at its substantially middle part in the vehicle-width directions. Herein, the hanging portion 2f which extends downward in the bumper-lower-face rear-end portion 2d has the same function as has been explained in the first embodiment.

As can be seen from FIG. 15C which shows the section, seen along a G—G line in FIG. 15A, the lower-plane portion 78 of the reinforcement portion 70 in front of the thick portion 84 includes a reinforcement concave portion 78a which is dented upward. Thus, the lower-plane portion 78 of the reinforcement portion 70 has a-three-dimensional structure with walls in three directions, ahead of the thick portion 84 which is fastened to the bumper-lower-face rear-end portion 2d. This presents a very strong structure in which that fastening part and its vicinity are not easily destroyed at the time of a bump.

The fastening structure of the lower-end part of the bumper lower face 2b and the reinforcement portion 70 has been explained above. Next, the fastening structure of the upper-end part of the bumper lower face 2b and the reinforcement portion 70 will be explained, based on FIG. 15B. FIG. 15B shows the section, seen along an F—F line in FIG. 14, which includes a hooking hole 68. In this figure, the bumper face 2 is connected to the grille-united reinforcement member 60.

At the sectional part along the F—F line of the reinforcement portion 70, different from that along the E—E line, the thick portion 84 is not formed in the lower-plane portion 78 of the reinforcement portion 70. Thus, the reinforcement portion 70 is not fastened, at its lower-end part, to the bumper-lower-face rear-end portion 2d. On the other hand, at the upper-end part of the reinforcement portion 70, the hooking hole 68 is formed in the hanging-plane portion 64a of the grille-united reinforcement member 60. Through this hooking hole 68, the claw portion 2c passes which extends rearward from the upper-plane portion 2e of the bumper lower face 2b. This claw portion 2c is hooked on a claw hooking portion 74a which is formed at the rear end of the upper-plane portion 74 of the reinforcement portion 70 and makes the lower surface of the hooking hole 68. Herein, as another embodiment, the shape of the claw portion 2c may be turned upside down to be hooked on the grille side.

As can be seen from the above description, the grille-united reinforcement member 60 is fitted into the opening portion 4 from behind the bumper face 2, by positioning the latticed portion 62 to the opening portion 4 and positioning the hooking hole 68 to the claw portion 2c. Then, the thick portion 84 of the reinforcement portion 70 is fastened to the bumper-lower-face rear-end portion 2d. This can reduce the number of members which are used for the assembly, thereby keeping costs down. In addition, the assembling work becomes easier, and the grille can be better fitted into the opening portion 4 provided in the bumper face 2, thus improving their appearance.

Figure 13:
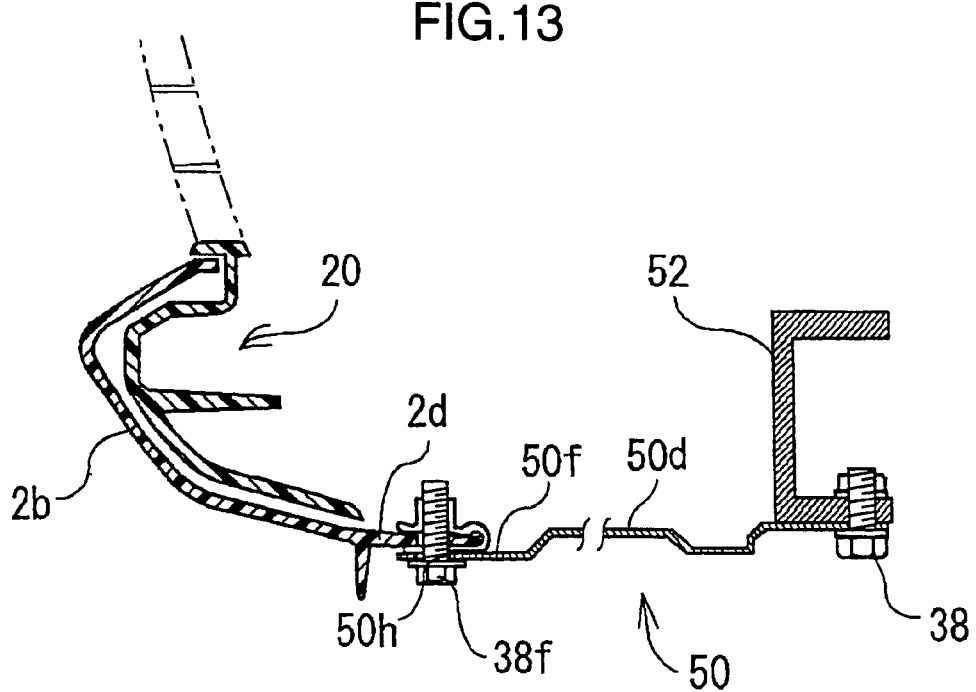
FIG. 13 is a sectional view of the under cover and the reinforcement member, seen along a D1-D3 line in FIG. 11.

Herein, the connecting structure of the reinforcement portion 70 and the bumper lower face 2b, and the connecting structure of the under cover used as the connection plate and the bumper lower face 2b, according to this third embodiment, are the same as the connecting structures shown in FIG. 12 and FIG. 13 according to the second embodiment. Hence, their description is omitted. Thus, the connecting structure of the reinforcement portion 70, the bumper lower face 2b, the under cover used as the connection plate and the cross member used as the vehicle structure body, according to the third embodiment, in FIG. 12 and FIG. 13, the reinforcement member 20 may be replaced with the reinforcement portion 70; the lower-plane portion 28, with the lower-plane portion 78; and the thick portion 34, with the thick portion 84. Their advantages are also the same as has been described with reference to FIG. 12 and FIG. 13. Herein, as another embodiment, the reinforcement portion 70 may also be connected to a vehicle structure body other than the cross member.

In summary, the automobile bumper structure according to a first aspect of the present invention comprises: a bumper face (2) in which an opening portion (4) used for introducing outside air is formed; said bumper face including a bumper lower face (2b) beneath said opening portion, a reinforcement member (20) which is provided behind and inside of said bumper lower face (2b); a grille (10) which is a separate body from the bumper face (2) is attached to the opening portion (4) from behind; and wherein said reinforcement member is connected to at least one part of said grille and is disposed behind and inside of said bumper lower face.

According to this first aspect, there is no need for any attachment member used exclusively as a reinforcement member, such as a bracket shown in the prior arts. This keeps costs from heightening and improves its assemblage. In addition, the reinforcement member can be disposed at a lower part of the bumper, thereby preventing a pedestrian or the like from getting caught behind the reinforcement member, or under a vehicle, when the pedestrian or the like has been hit by the vehicle.

Furthermore, the reinforcement member is connected to the grille, and thus, there is no need to provide an attachment stand via which the reinforcement member is attached to the reverse surface of the bumper lower face. This prevents a shrinkage cavity from being formed in the bumper lower face, thereby avoiding marring its appearance.

In the automobile bumper structure according to a second aspect of the present invention, the reinforcement member is connected unitedly with the grille.

According to the second aspect, the reinforcement member may be united with the grille, and thus, there is no need for any parts used exclusively as a reinforcement member. This keeps costs from heightening and improves its assemblage. In addition, the reinforcement member can be disposed at a lower part of the bumper.

In the automobile bumper structure according to a third aspect of the present invention, a hooking hole may preferably be provided at a boundary part between the grille and the reinforcement member on the lower side thereof, and a claw which extends rearward is provided at the upper end of the bumper lower face; and the claw is hooked on the hooking hole.

According to the third aspect, only by hooking the claw on the hooking hole, the reinforcement member is supported on the bumper face, and at the same time, the grille is supported on the bumper face. This improves its assemblage, and in addition, allows the grille to be better fit into the opening portion formed in the bumper face, thereby improving its appearance.

In the automobile bumper structure according to a fourth aspect of the present invention, the bumper lower face may protrude ahead of the opening portion and may have a receding shape from the tip thereof down below; the reinforcement member preferably includes an upper-plane portion, a front-plane portion, and a lower-plane portion, so that it is placed behind and inside of the bumper lower face; and a vertical rib is formed across these upper-plane portion, front-plane portion and lower-plane portion.

According to the fourth aspect, the vertical rib connects three-dimensionally the lower-plane portion, the front-plane portion and the upper-plane portion of the reinforcement member. This makes the reinforcement member stronger and more rigid, thereby preventing a pedestrian or the like from getting caught under a vehicle.

Furthermore, according to the fourth aspect, the front-tip part of the vertical rib is preferably linked to the front-plane portion of the reinforcement member, and that front-plane portion is preferably shaped like extending in the vehicle-width directions along the shape of the bumper lower face. This keeps the front-surface side of the reinforcement member from partially protruding with the vertical rib, and thus, prevents an impact from concentrating on the ribs of the reinforcement member. As a result, a pedestrian or the like can be prevented from being hit more severely.

Furthermore, according to the fourth aspect, the reinforcement member, which has a stronger and more rigid structure as described above, is preferably placed behind and inside of the bumper lower face. This prevents the part at which the bumper lower face protrudes forward from being crushed by a light-load input.

In the automobile bumper structure according to a fifth aspect of the present invention, the lower-plane portion of the reinforcement member is preferably fastened to a lower-plane portion of the bumper lower face.

According to the fifth aspect, the lower-plane portion of the reinforcement member is fastened stronger to the lower-plane portion of the bumper lower face, thereby making it structurally stronger and more rigid. This makes greater the effect produced by the fourth aspect.

In the automobile bumper structure according to a sixth aspect of the present invention, in the lower-plane portion of the reinforcement member, a thick portion is preferably formed at the rear end thereof; the thick portion is preferably fastened to the lower-plane portion rear-end of the bumper lower face; and a reinforcement concave portion which is dented upward is preferably formed in the lower-plane portion of the reinforcement member which is located ahead of the thick portion.

According to the sixth aspect, the lower-plane portion of the reinforcement member located ahead of the thick portion is not a flat surface, and thus, it is the three-dimensional reinforcement concave portion. This makes greater the rigidity at and near the part where the lower-plane portion rear-end of the reinforcement member is fastened to the lower-plane portion rear-end of the bumper lower face. As a result, when the vehicle has hit a pedestrian or the like, the part where the lower-plane portion rear-end of the reinforcement member is fastened to the lower-plane portion rear-end of the bumper lower face, and its vicinity, can be prevented from being destroyed. This can avoid the state in which the pedestrian or the like may get caught.

In the automobile bumper structure according to a seventh aspect of the present invention, the reinforcement member preferably includes side-plane portions which each extend rearward from both sides of right-and-left end parts thereof in the vehicle-width directions; and a lateral rib which crosses substantially perpendicularly to the vertical rib is formed across both side-plane portions and the front-plane portion.

According to the seventh aspect, the reinforcement member has a structure in which the side-plane portions are provided at its right and left parts and the lateral rib is provided which extends from these right-and-left side-plane portions. This makes the reinforcement member stronger and more rigid, thereby preventing the reinforcement member from being bent or broken by a light-load input.

Furthermore, according to the seventh aspect, the front-tip part of the lateral rib is preferably linked to the front-plane portion of the reinforcement member, and that front-plane portion is preferably shaped like extending in the vehicle-width directions along the shape of the bumper lower face. This keeps the front-surface side of the reinforcement member from partially protruding with the lateral rib, and thus, prevents an impact from concentrating on the ribs of the reinforcement member. As a result, a pedestrian or the like can be prevented from being hit more severely.

In the automobile bumper structure according to an eighth aspect of the present invention, an extending portion which preferably extends rearward is provided in the lateral rib; and vehicle parts which are loaded behind the grille are held on the extending portion.

According to the eighth aspect, the extending portion is formed, and thus, there is no need for any separate members which are used for attaching the parts loaded behind the grille. This can reduce the number of parts, as well as the number of assembly processes.

In the automobile bumper structure according to a ninth aspect of the present invention, an under cover is preferably provided which connects a lower-plane portion of the bumper lower face and a vehicle structure body which is disposed behind the bumper, across the lower-plane portion and the vehicle structure body in the vehicle-width directions.

According to the ninth aspect, the lower-plane portion of the bumper lower face is connected to the vehicle structure body disposed behind it, across them in the vehicle-width directions. This makes greater the supporting rigidity of the reinforcement member, and at the same time, makes greater the supporting rigidity of the bumper itself.

As described above, the present invention provides the automobile bumper structure which is capable of improving its assemblage, keeping the number of parts from increasing and keeping costs from heightening. It also provides the automobile bumper structure which is capable of preventing a pedestrian or the like from getting caught under a vehicle when the pedestrian or the like has been hit by the vehicle, and by means of the reinforcement structure part at the lower part of the bumper which stops the pedestrian or the like from getting caught, preventing the pedestrian or the like from suffering a more severe blow.

In the automobile bumper structure according to a tenth aspect of the present invention, comprises: a bumper face (2) in which an opening portion (10) used for introducing outside air is formed, said bumper face including a bumper lower face (2b) under said opening portion; a reinforcement member (20) which is provided behind and inside of the bumper lower face (2b), wherein said reinforcement member (20) is attached to the lower end (2d) of said bumper lower face (2b); and a connection plate (50) including: a first set of connection portions (50h) to be connected with the rear end part of the lower-plane portion (2d) of the bumper lower face (2b); a second set of connection portions (50g) to be connected to the vehicle structure body (52) so that the bumper face (2) is connected to the vehicle structure body (52); and a reinforcement structure portion (56) provided between the first set of connection portions (50h) and the second set of connection portions (50g).

According to the tenth aspect, first, the reinforcement member is attached to the lower end of the bumper lower face, and the connection plate which is connected to the vehicle structure body disposed behind the bumper face is connected to the vicinity of the attachment part in the vehicle-width directions. This makes greater the supporting strength of the vehicle structure body behind the reinforcement member inside of the bumper lower face. Thereby, when the front part of the vehicle has hit a pedestrian or the like, the whole reinforcement member, together with the bumper face, can be prevented from moving rearward. In addition, the connection plate is provided with the reinforcement structure portion, thereby making greater the supporting rigidity of the vehicle structure body behind the reinforcement member. This effectively prevents a pedestrian or the like from getting caught under the vehicle.

Furthermore, according to the tenth aspect, the bumper face and the connection plate are connected in the vicinity in the vehicle-width directions of the part at which the reinforcement member is attached to the lower end of the bumper lower face. Hence, the reinforcement member and the connection plate are united, within the narrow space, via the bumper lower face. This produces the synergism of connecting strengths at these connection parts, and thereby, makes the connection parts and their vicinities stronger than in the case where they are connected so that the attachment part of the reinforcement member to the bumper lower face is farther apart from the attachment part of the bumper lower face to the connection plate. Or, although its strength and rigidity as an automobile front structure body are equal to those in the case where three members of the reinforcement member, the lower end of the bumper lower face and the connection plate are connected at a single part, those respective connections can be made with relatively less fastening force. In addition, those members can be more easily positioned, thus improving their assembly.

In the automobile bumper structure according to an eleventh aspect of the present invention, the connection plate is an under cover which covers the vehicle front-lower part.

According to the eleventh aspect, the under cover is used as the connection plate which connects the connection body of the bumper lower face and the reinforcement member, and the vehicle-body structure body, though it is generally provided to cover the front-lower surface of a vehicle so as to lower the vehicle's running resistance. Therefore, there is no need for any additional connection members, thus keeping down an increase in weight.

In the automobile bumper structure according to a twelfth aspect of the present invention, an extending-out portion which extends rearward is preferably provided in the reinforcement member; and the extending-out portion is preferably fastened to the reinforcement structure portion.

According to the twelfth aspect, the reinforcement member and the connection plate are configured so that not only does the connection plate extend forward from the vehicle structure body to be connected to the reinforcement member, but also the extending-out portion which extends rearward from the reinforcement member is formed, this extending-out portion and the connection plate overlap each other with a sufficiently-large overlapping part, and the extending-out portion is fastened to the reinforcement structure portion formed in the connection plate. This makes greater the supporting rigidity of the vehicle structure body behind the reinforcement member.

In the automobile bumper structure according to a thirteenth aspect of the present invention, the bumper lower face preferably protrudes ahead of the opening portion in the vehicle front direction and has a rearward-receding shape from the tip thereof down below; the reinforcement member preferably includes an upper-plane portion which extends toward the vehicle front, a front-plane portion which extends downward from this upper-plane portion, and a lower-plane portion which extends rearward from this front-plane portion, so that the reinforcement member goes substantially along the shape of the bumper lower face behind and inside of the bumper lower face; a vertical rib is formed across the upper-plane portion, the front-plane portion and the lower-plane portion of the reinforcement member; the upper-plane portion of the reinforcement member is fastened to vehicle parts which are attached to the bumper face, or to the bumper lower face itself; and the lower-plane portion of the reinforcement member is fastened to a lower-plane portion of the bumper lower face.

According to the thirteenth aspect, the reinforcement member has a three-dimensional structure of the lower-plane portion, the front-plane portion and the upper-plane portion, and the vertical rib connects the upper-plane portion, the front-plane portion and the lower-plane portion. This makes stronger and more rigid the reinforcement part according to the above described tenth and eleventh aspects and also makes stronger the part at which the upper-plane portion and the lower-plane portion are fastened to the bumper lower face and the vehicle parts. Therefore, a pedestrian or the like can be prevented from getting caught under the vehicle.

Furthermore, according to the thirteenth aspect, the front-plane portion of the reinforcement member is preferably a plane which extends along the shape of the bumper lower face in the vehicle-width directions. This keeps the reinforcement member from protruding forward, which is shown in the prior art. Therefore, when the front part of a vehicle has hit a pedestrian or the like, its impact can be prevented from concentrating on the pedestrian or the like. This prevents the pedestrian or the like from being hit more severely.

In the automobile bumper structure according to a fourteenth aspect of the present invention, in the lower-plane portion of the reinforcement member, a thick portion is preferably formed at the rear end thereof; the thick portion is fastened to the lower-plane portion of the bumper lower face at the rear end thereof; and a reinforcement concave portion which is dented upward is formed in the lower-plane portion of the reinforcement member which is located ahead of the thick portion.

According to the fourteenth aspect, the lower-plane portion of the reinforcement member located ahead of the thick portion is not a plane, but the three-dimensional reinforcement concave portion. This makes greater the rigidity at and near the part where the rear end in the lower-plane portion of the reinforcement member is fastened to the rear end in the lower-plane portion of the bumper lower face. As a result, when the vehicle has hit a pedestrian or the like, the part where the lower-plane portion rear-end of the reinforcement member is fastened to the lower-plane portion rear-end of the bumper lower face, and its vicinity, can be prevented from being destroyed. This can avoid the state in which the pedestrian or the like may get caught.

In the automobile bumper structure according to a fifteenth aspect of the present invention, a lateral rib which crosses substantially perpendicularly to the vertical rib is preferably provided in the reinforcement member.

According to the fifteenth aspect, the lateral rib and the vertical rib make the reinforcement member stronger and more rigid, thereby preventing the reinforcement member from being bent or broken in the vehicle-width directions by a light-load input.

In the automobile bumper structure according to a sixteenth aspect of the present invention, the reinforcement member is united with a grille which is attached to the opening portion.

According to the sixteenth aspect, the reinforcement member is united with the grille attached to the opening portion. Hence, there is no need for any member used exclusively as a reinforcement member and any members used for fastening the reinforcement member. This keeps down an increase in weight, and also reduces costs.

As described above, the present invention provides the automobile bumper structure which is capable of keeping down an increase in weight, strongly supporting the reinforcement member on the vehicle structure body behind it, and firmly preventing a pedestrian or the like from getting caught under a vehicle when the pedestrian or the like has been hit by the vehicle.

This application is based on Japanese patent application serial Nos. 2002-373383 and 2002-373407, filed in Japan Patent Office both on Dec. 25, 2002, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An automobile bumper structure comprising:
   a bumper face in which an opening portion used for introducing outside air is formed; said bumper face including a bumper lower face beneath said opening portion,
   a reinforcement member which is provided behind and inside of said bumper lower face;
   a grille which is a separate body from the bumper face is attached to the opening portion from behind; and wherein said reinforcement member is connected to at least one part of said grille and is disposed behind and inside of said bumper lower face.

2. The automobile bumper structure according to claim 1, wherein said reinforcement member is united with said grille.

3. The automobile bumper structure according to claim 2, wherein:
   a hooking hole is provided at a boundary part between said grille and said reinforcement member on the lower side thereof, and a claw which extends rearward is provided at the upper end of said bumper lower face; and
   said claw is hooked on said hooking hole.

4. The automobile bumper structure according to claim 2, wherein:
   said bumper lower face protrudes ahead of said opening portion in the vehicle front direction and has a rearward-receding shape from the tip thereof down below;
   said reinforcement member includes an upper-plane portion which extends toward the vehicle front, a front-plane portion which extends downward from the upper-plane portion, and a lower-plane portion which extends rearward from the front-plane portion, so that the reinforcement member goes substantially along the shape of the bumper lower face behind and inside of the bumper lower face; and
   a vertical rib is formed across the upper-plane portion, the front-plane portion and the lower-plane portion of the reinforcement member.

5. The automobile bumper structure according to claim 4, wherein the lower-plane portion of said reinforcement member is fastened to a lower-plane portion of said bumper lower face.

6. The automobile bumper structure according to claim 5, wherein:
   in the lower-plane portion of said reinforcement member a thick portion is formed at the rear end thereof;
   the thick portion is fastened to the lower-plane portion of said bumper lower face at the rear end thereof; and
   a reinforcement concave portion which is dented upward is formed in the lower-plane portion of the reinforcement member which is located ahead of the thick portion.

7. The automobile bumper structure according to claim 4, wherein:
   said reinforcement member includes side-plane portions which each extend rearward from both end parts thereof in the vehicle-width directions; and
   a lateral rib which crosses substantially perpendicularly to said vertical rib is formed across both side-plane portions and the front-plane portion.

8. The automobile bumper structure according to claim 7, wherein:
   an extending portion which extends rearward is provided in said lateral rib; and
   vehicle parts which are loaded behind said grille are held on said extending portion.

9. The automobile bumper structure according to claim 2, wherein an under cover is provided which connects a lower-plane portion of said bumper lower face and a vehicle structure body which is disposed behind said bumper, across the lower-plane portion and the vehicle structure body in the vehicle-width directions.

* * * * *